United States Patent [19]

Keen et al.

[11] Patent Number: 4,549,439
[45] Date of Patent: Oct. 29, 1985

[54] MOISTUREPROOF LOAD CELL FOR FOOD PROCESSING APPLICATIONS AND METHOD FOR MAKING THE SAME

[75] Inventors: Harry J. Keen, Waterford; L. Paul Barrett, Concord, both of Vt.

[73] Assignee: Colt Industries Operating Corp, New York, N.Y.

[21] Appl. No.: 622,253

[22] Filed: Jun. 19, 1984

[51] Int. Cl.⁴ .......................... G01L 1/22; H01C 1/02
[52] U.S. Cl. ................................ 73/862.65; 73/855; 338/2
[58] Field of Search ............ 338/2, 308, 314, 3, 338/4; 73/862.65, 855

[56] References Cited

U.S. PATENT DOCUMENTS

| | | | |
|---|---|---|---|
| 3,089,107 | 5/1963 | Dean, III | 338/2 |
| 3,445,800 | 5/1969 | Ambulos et al. | 338/2 |
| 3,599,139 | 8/1971 | Low | 338/2 |
| 3,639,975 | 2/1972 | Brewer | 338/2 |
| 3,662,312 | 5/1972 | Thorp | 338/4 |
| 3,753,196 | 8/1973 | Kurtz | 338/4 |
| 3,828,295 | 8/1974 | Bradley | 338/6 |
| 3,863,192 | 1/1975 | Grey | 338/2 |
| 3,940,730 | 2/1976 | Brewer | 338/2 |
| 4,023,402 | 5/1977 | Watanabe | 338/2 |
| 4,079,508 | 3/1978 | Nunn | 29/580 |
| 4,212,197 | 7/1980 | Kawai | 338/5 |
| 4,332,081 | 6/1982 | Francis | 338/308 |
| 4,343,197 | 8/1982 | Suzuki et al. | 73/862.65 |

Primary Examiner—Donald O. Woodiel
Attorney, Agent, or Firm—Sixbey, Friedman & Leedom

[57] ABSTRACT

A vapor and moistureproof electrical component such as an electrical load cell is formed by mixing a light oil such as mineral oil with liquid silicone gel and then curing the mixture in place to encapsulate an electrical component.

18 Claims, 3 Drawing Figures

MOISTUREPROOF LOAD CELL FOR FOOD PROCESSING APPLICATIONS AND METHOD FOR MAKING THE SAME

DESCRIPTION

1. Technical Field

The present invention relates to load cells generally and more particularly to a method for moistureproofing load cells used in food weighing applications in a non-toxic manner.

2. Background Art

Over the years, a number of different substances have been developed to protect electrical equipment from moisture. These include various elastomers, waxes, oils, silicones, and other water repellent materials, all of which have operated effectively to protect certain types of electrical equipment from moisture under specified conditions.

The moistureproofing of strain gage load cells presents unique problems which are normally not prevalent with other types of electrical equipment. For a load cell to operate effectively, electrical strain gages must be mounted upon a beam or other cell body to sense compression, tension, or shear forces induced in the body by a force to be measured. Many moistureproofing materials which are generally employed to protect electrical components against moisture, when used to encapsulate load cell strain gages, adversely affect the ability of the load cell body to react to an applied force. For example, a hard non-resilient resin covering the strain gages and adhered to the cell body will inhibit flexure in a beam type load cell, thereby altering and even destroying the response of the load cell to a given applied force.

For many load cell moisture protection applications, extremely flexible protective substances which provide minimal resistance to the force induced in the cell body have proven to be effective. Cell strain gages have been immersed in oil as shown by U.S. Pat. No. 3,445,800 to C. P. Ambulos et al or have been encapsulated in soft elastomers as shown by U.S. Pat. No. 3,089,107 to M. Dean, U.S. Pat. No. 3,599,139 to M. E. Low, and U.S. Pat. No. 4,343,197 to S. Suzuki et al. Silicone plastic polymers have also been used to protect strain gage load cells as illustrated by U.S. Pat. No. 3,940,730 to Brewer, and commercially resilient silicone gels have been found to be ideally suited for load cell moisture protection in normal environments.

The problems normally encountered when protecting a strain gage load cell against moisture are compounded when the load cell is to be incorporated in measuring equipment used in a food processing environment. This equipment must not contain any toxic substances, and consequently many greases and other chemical containing compounds conventionally used to moistureproof load cells are not suitable for use in equipment for weighing food. Even more problematic, however, is the treatment which all food processing equipment must withstand. This equipment is repeatedly subjected to cleaning with high pressure jets of hot water which will cause water vapor to penetrate what previously has been considered to be the most effective moisture sealing agents. Load cells which have been moistureproofed by encapsulation with sealing agents, such as commercially available silicone gel, can be completely immersed in water for long periods of time without having water reach the protected strain gages. However, these same load cells with identical moisture protection have been found to be unable to withstand the water jet treatment to which food processing equipment is subjected, for within a short period of time, water vapor penetrates the protective gel and reaches the electrical strain gages.

Elastomers, waxes, greases, silicone gels and other moisture sealing agents contain minute pores which normally do not permit moisture to reach a component protected by the sealing agent. However, when these sealing agents are subjected to repeated treatment with high pressure hot water jets, water vapor is driven into these pores and eventually penetrates to reach the protected component. Consequently, a need has arisen for an effective, nontoxic moisture sealing agent which may be applied to a strain gage load cell to protect the cell strain gages from moisture in a food processing environment without adversely affecting cell operation.

DISCLOSURE OF THE INVENTION

It is a primary object of the present invention to provide a novel and improved non-toxic moisture sealing agent for electrical components which may be effectively used in food processing applications. This sealing agent will operate to prevent water vapor from reaching a protected component encapsulated therein when the encapsulated assembly is subjected to repeated applications of high pressure hot water jets.

Another object of the present invention is to provide a novel and improved non-toxic moisture sealing agent from silicone gel impregnated with mineral oil which seals the pores of the gel against water vapor.

A further object of the present invention is to provide a novel and improved method for moistureproofing a load cell which includes encapsulating the load cell strain gages in a dielectric silicon gel impregnated with a light, nontoxic oil.

Another object of the present invention is to provide a novel and improved method for moistureproofing a load cell which includes placing the load cell between a top and bottom mold section and inserting a mixture of silicone dielectric gel and mineral oil blend into the molds so as to cover the stain gages for the load cell. Next the silicone gel and oil mixture is cured to form an encapsulating structure over the load cell strain gages.

A still further object of the present invention is to provide a novel and improved strain gage load cell having a load cell body with electrical strain gages mounted thereon. These electrical strain gages are encapsulated by a cured silicone gel and oil mixture which is adhered to the load cell body.

These and other objects of the present invention are accomplished by mixing liquid silicone dielectric gel in a mixture consisting of 4 to 10% of light oil and blending the gel-oil combination until the mixture is clear. For food service applications, a non-toxic oil, such as mineral oil is ideal, and once formed, the mixture can be poured into a mold over the strain gages of a load cell. Subsequently, the mixture in the mold is cured and the mold is then removed.

A mold is employed which contains at least one mold chamber arranged over the strain gages which are mounted upon the load cell body. To provide a load cell having strain gages on opposite sides of the cell body encapsulated in the same capsule, the load cell body is provided with substantially parallel spaced openings. The strain gages are mounted upon the web between these openings and opposed mold cavities are formed to provide a unitary capsule on both sides of the mold body which extends above any electrical component encapsulated therein for at least one eighth of an inch.

BEST MODE FOR CARRYING OUT THE INVENTION

Figure 1:
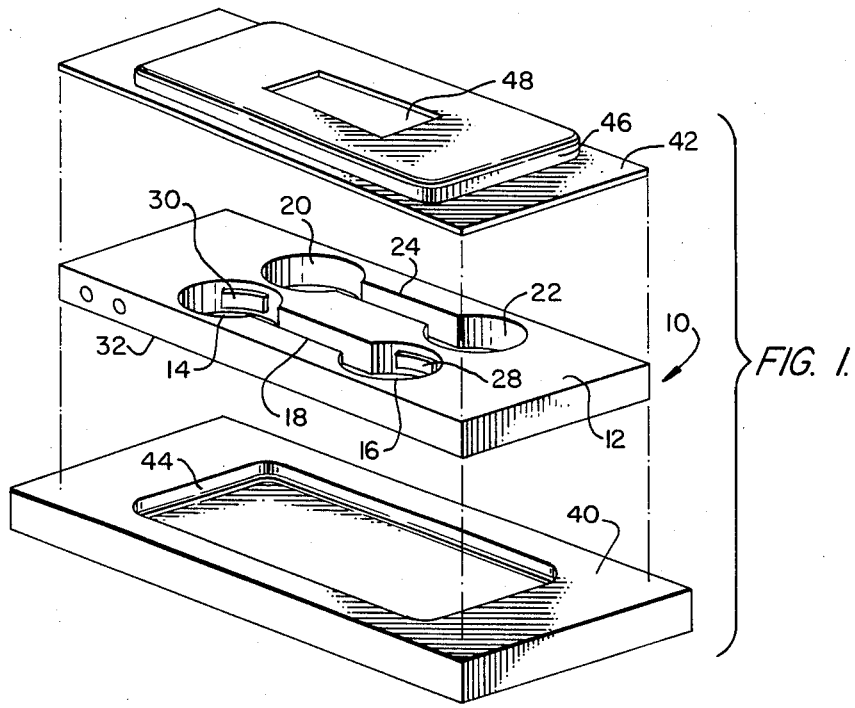
FIG. 1 is an exploded perspective view of a mold for forming one embodiment of the load cell of the present invention in accordance with the method thereof.

A number of dielectric silicone gels are presently commercially available for encapsulating electrical components. For example, DOW CORNING Q3-6527A&B silicone dielectric gel provides a transparent silicone encapsulate for protecting electrical circuits in severe environments. Such commercially available silicone gel encapsulates have been found to be well adapted for load cell use under normal conditions, for the liquid silicone gel may be poured over the load cell strain gages and electrical connections therefore and cured in place to form a very resilient, gel-like mass. Although this mass retains the dimensional stability characteristics of a solid elastomer and exhibits a permanent adhesive bond to most substrates, the mass is reformable and does not degrade the response of a load cell body to force applied thereto.

As previously indicated, a silicone gel encapsulate is highly moisture resistant, and will resist moisture under complete fluid immersion conditions for long periods of time. However, it has been found that a silicone gel encapsulate is not resistant to water vapor under pressure for significant time periods, and water vapor quickly penetrates the pores of the silicone gel mass to reach the protected electrical component.

On the other hand, tests leading to the development of the present invention have indicated that the pores in a silicone gel encapsulate can be sealed to render the encapsulate impervious to water vapor under pressure for substantial periods of time. This is accomplished by adding a light oil to the silicone dielectric gel mix while the mix is still in liquid form before curing. Sufficient oil must be added to uncured liquid silicone gel so that the pores of the gel will be filled with oil after curing, but the amount of added oil must not be so great that the gel will not properly cure to form a non-flow mass having dimensional stability. Commercially available mineral oil has been found to be an excellent oil to mix with liquid silicone gel, and an adequate level of moisture protection with acceptable cured gel strength may be obtained by a mixture having within a range of from 4% to 10% of light oil, such as commercial mineral oil. A mixture which includes 5% of mineral oil has been found to provide great gel strength as well as a good level of moisture protection. The advantage of mineral oil is that this oil is non-toxic and is acceptable for use in food service applications, as is commercially available silicone gel. However, pure mineral oil with no additives must be used. Such mineral oil, for example, is sold as "pure mineral oil" by E. R. Squibb & Sons.

In accordance with the present invention, the components necessary to form the liquid silicone gel prior to curing are first mixed together. For example, when using DOW CORNING ® silicone dielectric gel number 3-6527, two components used to form the liquid gel are fixed mixed together and then a light oil, such as mineral oil, is added in an amount equal to within the range of 4% to 10% of the total mixture. The mixture is then blended until clear, (approximately 5 minutes) and allowed to set so that air bubbles can dissipate (approximately 15 minutes). This provides a liquid silicone gel-oil mixture which can be cured to provide a resilient, gel-like mass which adheres well to many substrates. The pores of the mass are sealed with oil, and the mass is somewhat oily to the touch. When the mass is adhered to the substrate, some oil bleeds from the pores thereof to create a film on both the external surface of the mass as well as in the area adjacent the mass-substrate juncture. This enhances the ability of the oil within the mass to act as a barrier against water vapor.

In accordance with the present invention, the liquid silicone gel/oil mixture may be poured into a mold and then cured at elevated temperatures. It has been found that a well cured encapsulate may be obtained by curing the mixture at temperatures within the range of from 150° F. to 302° F., although curing can be accomplished at normal non-elevated temperatures if an extremely long cure time is provided. At temperatures of 200° F., the mixture will normally become well cured in three hours, and the curing can be accomplished in an evacuated chamber to remove any air bubbles which might remain during the curing process.

Referring now to FIG. 1, a load cell indicated generally at 10 includes a cell body 12 which, in this case, constitutes a rectangular metal body of known type. The metal body is formed with a first pair of spaced holes 14 and 16 joined by a straight cut or slot 18 extending therethrough. The body also includes a second set of spaced holes 20 and 22 which are formed in spaced, aligned relationship with the holes 14 and 16 respectively, and which are joined by a straight cut or slot 24 extending through the body 12 in substantially parallel relationship to the straight cut 18. This arrangement permits concentrated stresses to occur at locations where strain gages are fixed to the body 12 when force is applied to the body. For example, if force is to be applied to the edge of the body 12 in a direction transverse to the slots 18 and 24, strain gages might be affixed to opposed surfaces of the holes 14 and 20 and the holes 16 and 22. Each of these strain gages has electrical connections as illustrated by the conductors 38 in FIG. 2.

To this point, the load cell construction 10 of FIG. 1 is relatively conventional and is illustrative of one type of load cell which may be formed in accordance with the present invention. When the load cell is provided with a plate type body 12 having flat upper and lower surfaces 26 and 32 of the type illustrated by FIG. 1, the load cell may be placed between two plate type mold sections 40 and 42. The mold sections 40 forms the bottom mold section which engages the surface 32 of the load cell body 12. This bottom mold section includes a concave cavity 44 which is of sufficient size to extend over and encompass the holes 14, 16, 20 and 22. Similarly, the upper mold plate 42 contacts the upper surface 26 of the load cell body 12, and includes a concave mold cavity 46 which corresponds to the mold cavity 44 and covers the holes 14, 16, 20 and 22. Unlike the mold cavity 44, the mold cavity 46 includes an opening 48 so that the silicone gel/oil mixture can be introduced into the mold.

In operation, the mold sections 42 and 44 are clamped on either side of the load cell body 12 and then the silicone gel/oil mixture is poured in through the opening 48 until the cavities 44 and 46 are filled. The mixture passes down through the openings 14, 16, 20 and 22 as well as through the slits 18 and 24 to fill the lower mold cavity 44. Once the lower mold cavity and upper mold cavity are filled, the complete assembly can be placed into a temperature chamber and heated to cure the silicone gel. When the assembly is removed from the temperature chamber and the top and bottom mold sections are disengaged from the load cell body 12, the novel encapsulated load cell of FIGS. 2 and 3 will result. It will be noted in these figures that the load cells 28, 30, 34 and 36 as well as the electrical connections to these load cells are completely encapsulated in an upper layer 50 and a lower layer 52 formed from the cured silicone gel/oil mixture. The layers 50 and 52 are joined by this cured encapsulating material which also fills the holes 14, 16, 20 and 22 as well as the slots 18 and 24. It is important for the encapsulating layers 50 and 52 to extend around any electrical component encapsulated therein for at least one eighth inch. Thus, the dimension a in FIG. 3 is at least one eighth inch or more.

Figure 2:
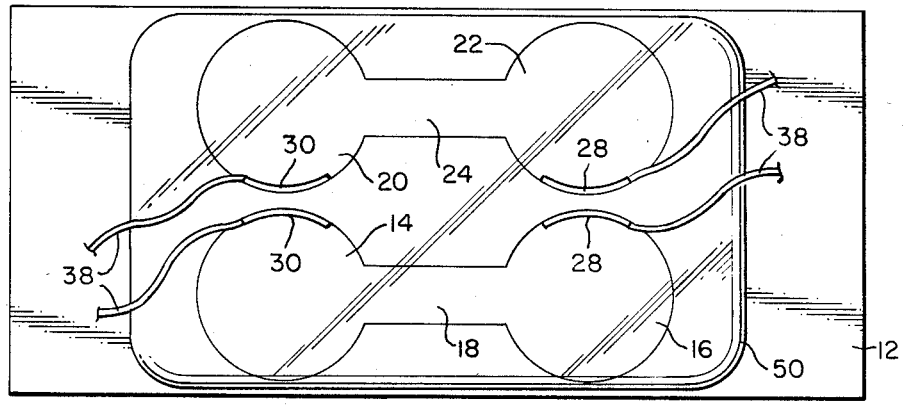
FIG. 2 is a plan view of the load cell of the present invention having encapsulated strain gage elements.
Figure 3:
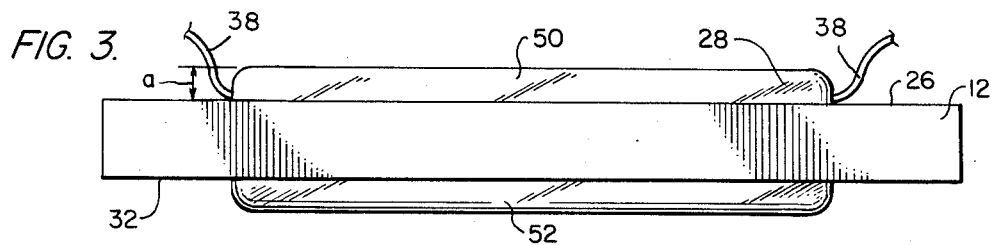
FIG. 3 is a view in side elevation of the load cell of FIG. 2.

The load cell of FIGS. 2 and 3 is only one embodiment of a load cell which might incorporate the encapsulate structure of the present invention. For example, in an elongated beam type load cell which does not have the flat plate type body 12, the load cells on the surface of the beam might be encapsulated by a sleeve formed of the novel encapsulating material of the present invention which is bonded to surround the beam on which the strain gages are mounted while encapsulating the strain gages. Again, the thickness of the encapsulating material surrounding the electrical components for the load cell would be at least one eighth inch.

INDUSTRIAL APPLICABILITY

The vaporproofing material of the present invention may be effectively employed to protect electrical components against moisture and water vapor under pressure, particularly in food processing environments where non-toxic materials must be employed. As a result of the method of the present invention, a novel vapor proof load cell is formed from non-toxic materials which will operate accurately and effectively to provide force measurements. This load cell may be subjected to numerous applications of water under pressure without permitting moisture resulting from water vapor to reach the strain gage units on the cell.

We claim:

1. A load responsive transducer device comprising a transducer body electrical transducer means mounted on said transducer body to provide an output indicative of the magnitude of a force applied to said transducer body, and encapsulating means adhered to said transducer body and completely encapsulating said electrical transducer means, and encapsulating means being formed by a mixture of silicone gel and oil.

2. The load responsive transducer device of claim 1 wherein said encapsulating means forms a layer of at least one eighth inch thickness over said electrical transducer means.

3. The load responsive transducer device of claim 1 wherein said oil is non-toxic oil.

4. The load responsive transducer device of claim 3 wherein said oil is mineral oil.

5. The load responsive transducer device of claim 1 wherein said oil constitutes 4% to 10% of the silicone gel and oil mixture.

6. The load responsive transducer device of claim 5 wherein said oil is a non-toxic oil.

7. The load responsive transducer device of claim 6 wherein said encapsulating means is formed by a cured silicone gel and oil mixture wherein the oil is mineral oil.

8. The load responsive transducer device of claim 7 wherein said encapsulating means forms a layer of at least one eighth inch thickness over said electrical transducer means.

9. The load responsive transducer device of claim 1 wherein said transducer body includes at least one opening extending therethrough to enhance the response of said transducer device to force applied to said transducer body, said encapsulating means filling at least a portion of said opening.

10. The load responsive transducer device of claim 9 wherein said electrical transducer means includes electrical strain gages mounted upon said transducer body within said opening, said encapsulating means forming a layer of at least one eighth thickness over said electrical strain gages.

11. The load responsive transducer device of claim 10 wherein said oil constitutes 4% to 10% of the silicone gel and oil mixture.

12. The load responsive transducer device of claim 11 wherein said oil is a non-toxic oil.

13. The load responsive transducer device of claim 12 wherein said oil is mineral oil.

14. A method for protecting an electrical component against moisture caused by water vapor which includes mixing liquid, uncured silicone gel with an amount of oil which does not exceed an amount sufficient to preclude the subsequent curing of the silicone gel and oil mixture, covering the exposed surfaces of the electrical component to be protected with the liquid silicone gel and oil mixture, and curing the liquid silicone gel and oil mixture covering said exposed surface.

15. The method of claim 14 which includes covering the exposed surfaces to be protected of said electrical component with a layer of uncured liquid silicone gel and oil mixture sufficient to form a cured layer of at least one eighth inch in thickness when the silicon gel and oil mixture is cured.

16. The method of claim 14 wherein said oil is a non-toxic oil.

17. The method of claim 16 wherien said oil is a mineral oil.

18. The method of claim 14 wherein said oil constitutes 4% to 10% of the silicone gel and oil mixture before curing.

* * * * *